United States Patent [19]

Robinson

[11] Patent Number: 5,752,163

[45] Date of Patent: May 12, 1998

[54] METHOD AND APPARATUS FOR ONE-WAY RECEIVER OPERATION FROM A TWO-WAY COMMUNICATION DEVICE

[75] Inventor: Edward Herbert Robinson, Fort Worth, Tex.

[73] Assignee: Motorola, Inc., Schaumburg, Ill.

[21] Appl. No.: 707,167

[22] Filed: Aug. 30, 1996

[51] Int. Cl.$^6$ .................................................. H04Q 7/20
[52] U.S. Cl. ..................... 455/31.3; 455/426; 340/825.44
[58] Field of Search ........................... 455/31.2, 31.3, 455/38.1, 38.2, 38.3, 38.4, 422, 426, 458, 517, 524, 343; 340/825.44, 825.49, 825.54

[56] References Cited

U.S. PATENT DOCUMENTS 5,423,063  6/1995  Goldberg .
5,574,771  11/1996  Driessen et al. .......................... 455/426

*Primary Examiner*—Reinhard J. Eisenzopf
*Assistant Examiner*—Sam Bhattacharya
*Attorney, Agent, or Firm*—Pablo Meles

[57] ABSTRACT

A communication system (10) having a plurality of selective call transceivers (30) which can operate as one-way selective call receivers in a one-way coverage zone (16) or as selective call transceivers in a two-way coverage zone (36) comprises a plurality of outbound transmitters (17, 18, and 19) covering one-way coverage zones (12, 14, and 16 respectively) and a plurality of base receivers (37, 38, and 39) and transmitters (11, 13, and 15) covering two-way coverage zones (32, 34, and 36 respectively), a plurality of selective call transceivers (30) having a preferred one-way zone list and controllers (41–46) having a preferred one-way zone list matching the preferred one-way zone list in the selective call transceiver, the selective call transceivers capable of detecting the one-way coverage zone and disabling the two-way function of the selective call transceiver.

17 Claims, 4 Drawing Sheets

METHOD AND APPARATUS FOR ONE-WAY RECEIVER OPERATION FROM A TWO-WAY COMMUNICATION DEVICE

FIELD OF THE INVENTION

This invention relates in general to a two-way communication system and more specifically to a two-way communication device that can operate in one-way zones.

BACKGROUND OF THE INVENTION

The advent of two-way messaging presents a wide variety of new problems. To understand some of the problems, knowledge of two-way paging or messaging from a system level would be useful. In particular, a two-way paging or messaging system typically has an infrastructure system including a plurality of outbound transmitters coupled to a controller for encoding, batching and scheduling the transmission of messages to be sent over the air to a plurality of portable two-way subscriber units. The subscriber units, not considered part of the infrastructure, transmit inbound messages that are received by at least one of a plurality of base receivers which are also coupled to the controller. Thus, the controller further provides the function of correlating outbound messages from the outbound transmitters with the inbound messages from the subscriber units.

It is desirable to have a two-way messaging device, pager, or subscriber unit be able to operate in an area where there are no base receivers or where coverage is only provided by a one-way outbound base transmitter (or otherwise known as a one-way zone.) With existing two-way paging systems, the two-way subscriber device does not simply disable it's two-way functionality when the device detects that it is in a one-way zone. In fact, current two-way devices will not receive any messages until the system knows where the device is located since it cannot register in a one-way zone. Currently, the two-way device might display a prompt directing the user to call the service provider to notify the system of their current location. This "phone-in" registration is undesirable and creates an unnecessary burden on the user. Thus, a need exists for a communication system that allows a selective call transceiver for operation in a two-way coverage zone to seamlessly operate as a one-way selective call receiver in a one-way coverage zone.

SUMMARY OF THE INVENTION

In a first aspect of the present invention, a method of making a selective call transceiver operational as a one-way receiver in a one-way selective call receiver coverage zone comprises the steps at the selective call transceiver of maintaining a preferred one-way zone list, detecting a one-way zone, matching the one-way-zone with a one-way zone on the preferred one-way zone list and disabling a two-way function of the selective call transceiver if a match exists between the one-way zone detected and the one-way zone on the preferred one-way zone list.

In another aspect of the present invention, a communication system having a plurality of selective call transceivers which can operate as one-way selective call receivers in a one-way coverage zone or as selective call transceivers in a two-way coverage zone comprises a plurality of outbound transmitters covering one-way coverage zones, and a plurality of base receivers covering a two-way coverage zone. At least one of the plurality of selective call transceivers has a preferred one-way zone list and is capable of disabling the two-way function of the two-way selective call transceiver when detecting a one-way coverage zone.

In yet another aspect of the present invention, a selective call transceiver which can operate as one-way selective call receiver in a one-way coverage zone or as selective call transceiver in a two-way coverage zone comprises a selective call receiver coupled to a decoder and a controller, a selective call transmitter coupled to the controller and an encoder, and a memory coupled to the controller containing a list of preferred one-way zones, wherein the selective call transceiver will operate as a selective call receiver if the selective call receiver fails to detect a two-way coverage zone and detects a matching preferred one-way zone.

In another aspect of the present invention, a controller for operation in a communication system where a plurality of selective call transceivers can operate as one-way selective call receivers in a one-way coverage zone or as selective call transceivers in a two-way coverage zone comprises a memory having a plurality of preferred one-way zone lists corresponding to preferred one-way zone lists in the plurality of selective call transceivers which is periodically updated with the preferred one-way zone list in the plurality of selective call transceivers and a processor for performing the functions of detecting the presence of a selective call transceiver in a two-way zone and either continuing two-way communication if the selective call transceiver is found in the two-way zone or sending one-way outbound messages to the selective call transceiver to a one-way zone if a user directed messages to the one-way zone or otherwise sending one-way outbound messages to the selective call transceiver to the zone or zones designated in the preferred one-way zone list if no two-way zone is detected and no one-way zone is directed by a user of the selective call transceiver.

DETAILED DESCRIPTION

Figure 1:
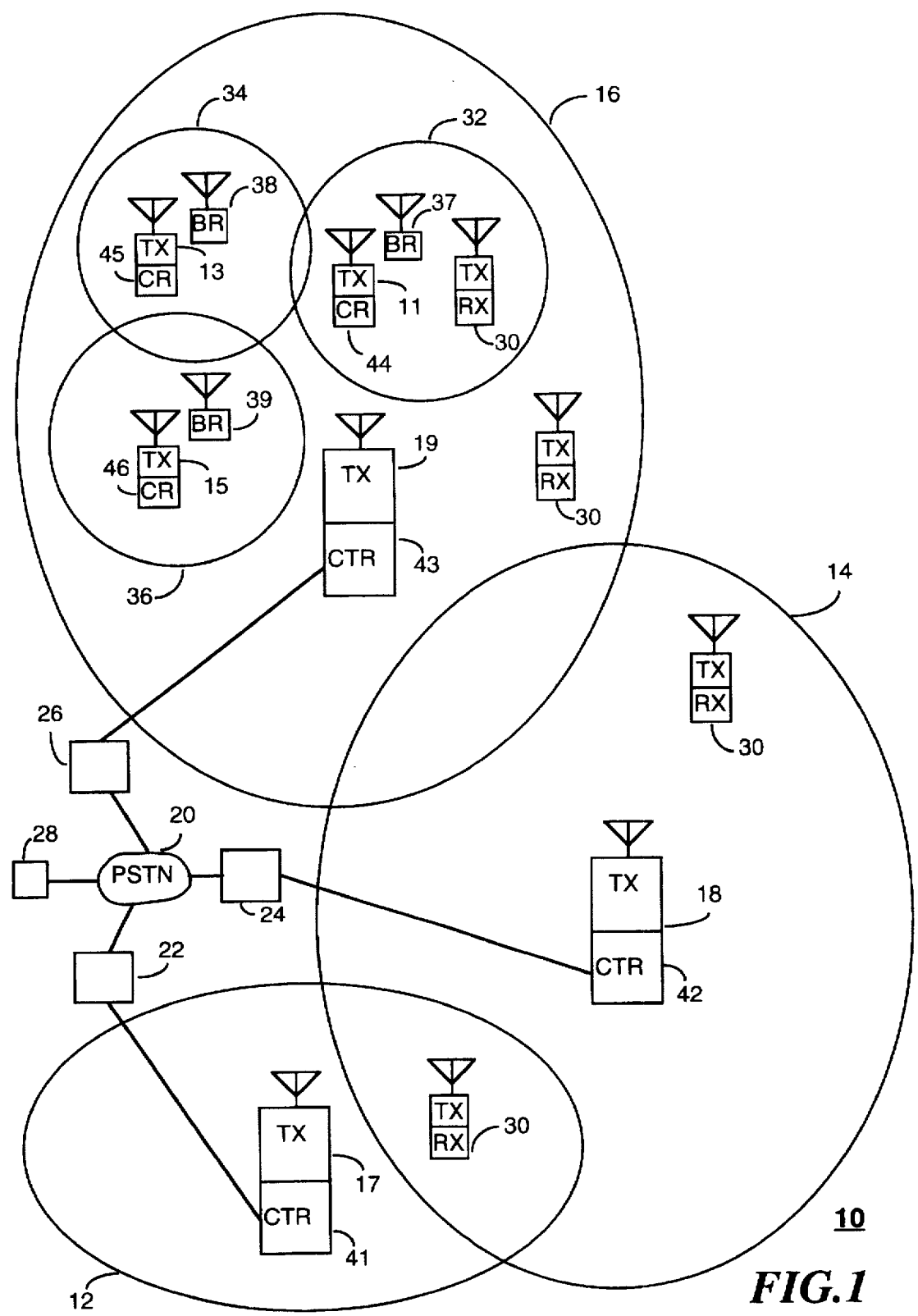
FIG. 1 is a block diagram of a communication system in accordance with the present invention.

Referring to FIG. 1, there is shown a communication system 10 having a plurality of selective call transceivers 30 which can operate as one-way selective call receivers in one of many one-way coverage zones (such as zones 12, 14 or 16) or as selective call transceivers in two-way coverage zones (such as zones 32, 34, or 36). The communication system 10 preferably comprises a plurality of outbound transmitters 17, 18, and 19 covering the one-way coverage zones 12, 14 or 16 and optionally a plurality of outbound transmitters 11, 13, and 15 covering the two-way coverage zones 32, 34, and 36 respectively. The communication system 10 further comprises a plurality of base receivers 37, 38, and 39 also covering the two-way coverage zones for inbound transmissions from subscriber units such as the selective call transceivers 30. Preferably, at least one of the plurality of selective call transceivers 30 has a preferred one-way zone list and is capable of detecting the one-way coverage zones and disabling the two-way function of the two-way selective call transceiver as the transceiver travels into a one-way coverage zone. The subscriber units can use various methods to distinguish transmissions from the plurality of outbound transmitters designated for the two-way coverage zones from transmissions from outbound transmitters for one-way coverage zones. Preferably the subscriber unit will seek for an embedded bit of information sent by either the outbound transmitters designated for the two-way coverage zones or the outbound transmitters covering the one-way coverage zones. Further, the selective call transceiver will preferably operate in an hierarchical fashion, registering and operating as a transceiver in a two-way zone even if the one-way zone overlaps the two-way zone. Preferably the communication system 10 stores a preferred one-way zone list matching the preferred one-way zone list in the selective call transceiver in the infrastructure portion. Preferably this list is stored in one of many paging controllers such as the controllers 41, 42, 43, 44, 45, or 46. Alternatively, the list could be stored in one of many wireless message gateways 22, 24, or 26 that preferably couple to the controllers. Additionally, the communication system 10 preferably includes an input device 28 such as a telephone, computer, or alpha entry device that couples to the phone network 20 and subsequently to the wireless message gateways.

Figure 2:
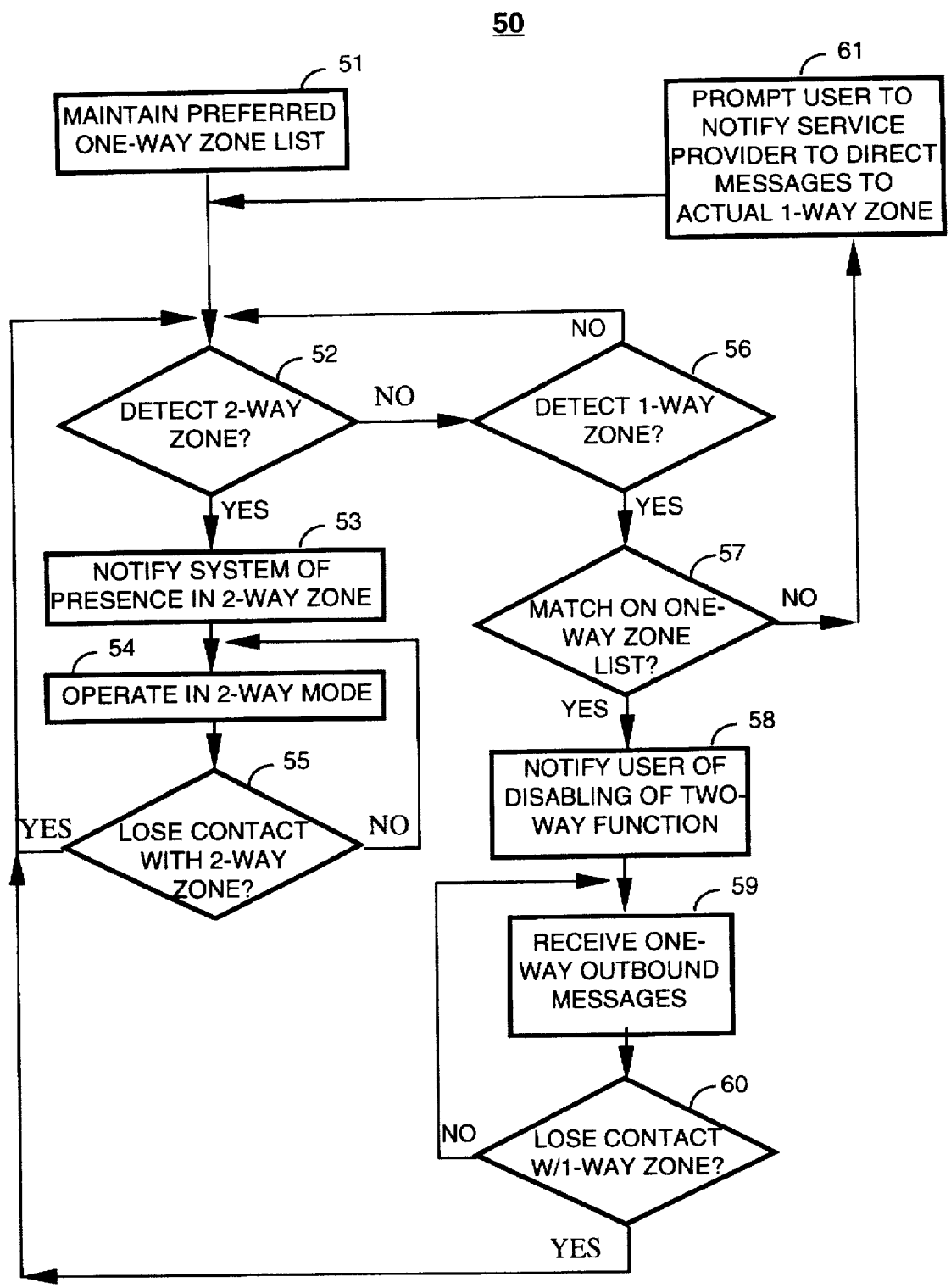
FIG. 2 is a flow chart of a selective call transceiver method in accordance with the present invention.

Referring to FIG. 2, a flow chart of a method 50 for making a selective call transceiver operational as a one-way receiver in a one-way selective call receiver coverage zone is shown. At block 51, the method preferably comprises the step at the selective call transceiver of maintaining a preferred one-way zone list. At decision block 52, the selective call transceiver attempts to detect a two-way zone. If the selective call transceiver detects a two-way zone, then the transceiver notifies the system of its presence in the two-way zone at block 53 and the transceiver continues to operate in a two-way mode at step 54. At decision block 55, if contact is lost with the two-way zone, the transceiver again attempts to detect a two-way zone and otherwise continues to operate in a two-way mode.

If no two-way zone is detected at decision block 52, then the the selective call transceiver attempts to detect a one-way zone at decision block 56. If a one-way zone is not detected, then the transceiver will return to scan for two-way zones. If a one-way zone is detected, then at decision block 57, the transceiver determines if the one-way zone detected matches a zone on the preferred one-way zone list. If a match is found at decision block 57, then the transceiver notifies the user that the two-way function will be disabled at block 58. In other words, the transmitter portion of the transceiver will be disabled or substantially disabled and the transceiver will only receiver one-way outbound messages as shown in block 59. If contact is lost with the one-way zone at decision block 60, then the transceiver again preferably returns to scanning for two-way zones. Returning to decision block 57, if the one-way zone that was detected does not match a zone on the preferred one-way zone list, then the selective call transceiver can prompt the user to notify their service provider (typically by calling into a paging terminal) to direct messages to the actual one-way zone by describing their location as described in block 61. The notification to the user preferably takes the form of a alphanumeric message on a liquid crystal display, although other forms of notice can be given, such as a voice prompt by a voice pager such as Motorola's Tenor™ subscriber unit.

Figure 3:
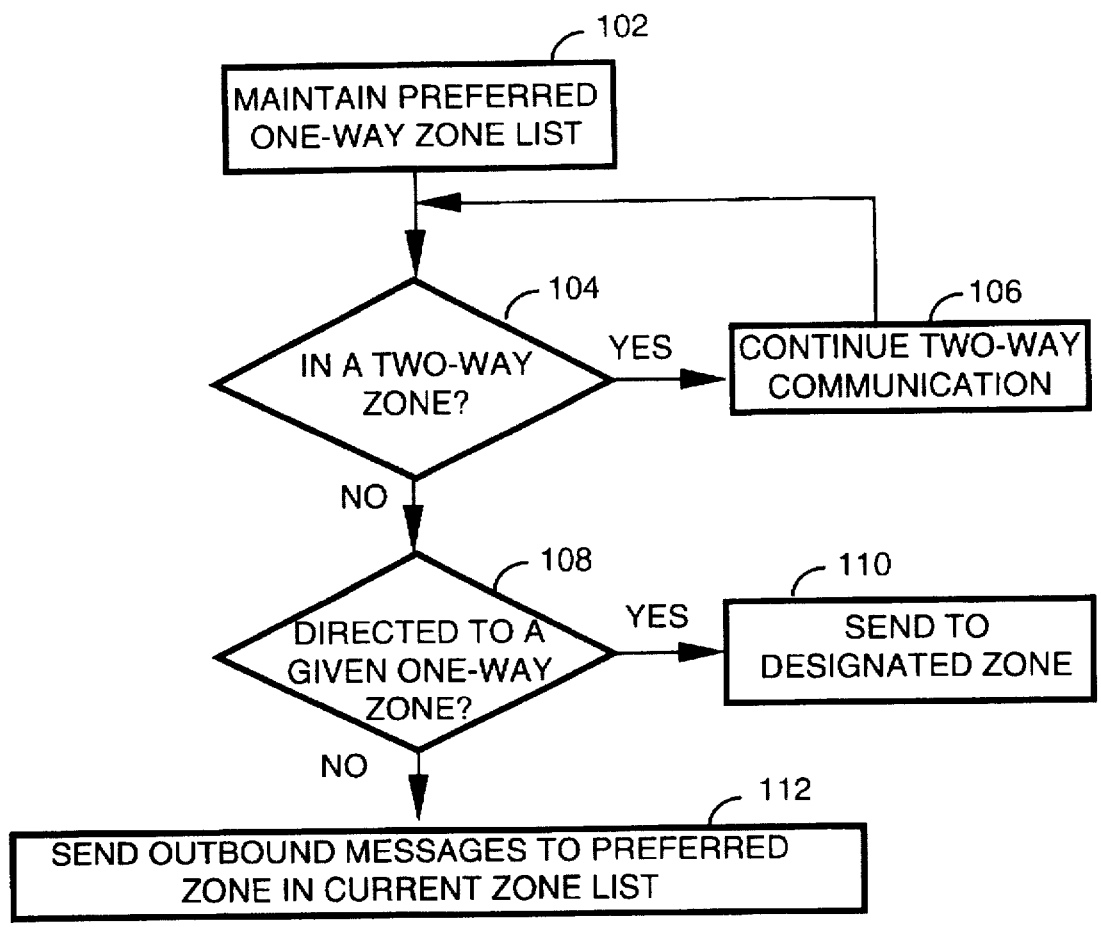
FIG. 3 is a flow chart of a controller method in accordance with the present invention.

Referring to FIG. 3, a method 100 can comprise the method at a controller of maintaining a preferred one-way zone list matching the list in the two-way selective call transceiver at block 102. Next, at decision block 104, if a particular selective call transceiver is in a two-way zone, then two-way communication is continued at block 106. At decision block 108, it is determined if the selective call transceiver was directed to a given one-way zone. If the selective call transceiver is not in a two-way zone, then at block 110 one-way outbound messages are sent to the selective call transceiver to a user directed one-way zone. If the selective call transceiver is not in a two-way zone and the user did not direct messages to a particular one-way zone, then the controller will send all subsequent messages as one-way outbound messages to the selective call transceiver to the zone or zones designated in the preferred one-way zone list at block 112. The manner in which the preferred one-way zone list is maintained could include the step of statistically deriving the preferred one-way zone list at the two-way selective call transceiver and updating the preferred one-way zone list at the controller when the selective call transceiver enters a two-way zone and reregisters.

Figure 4:
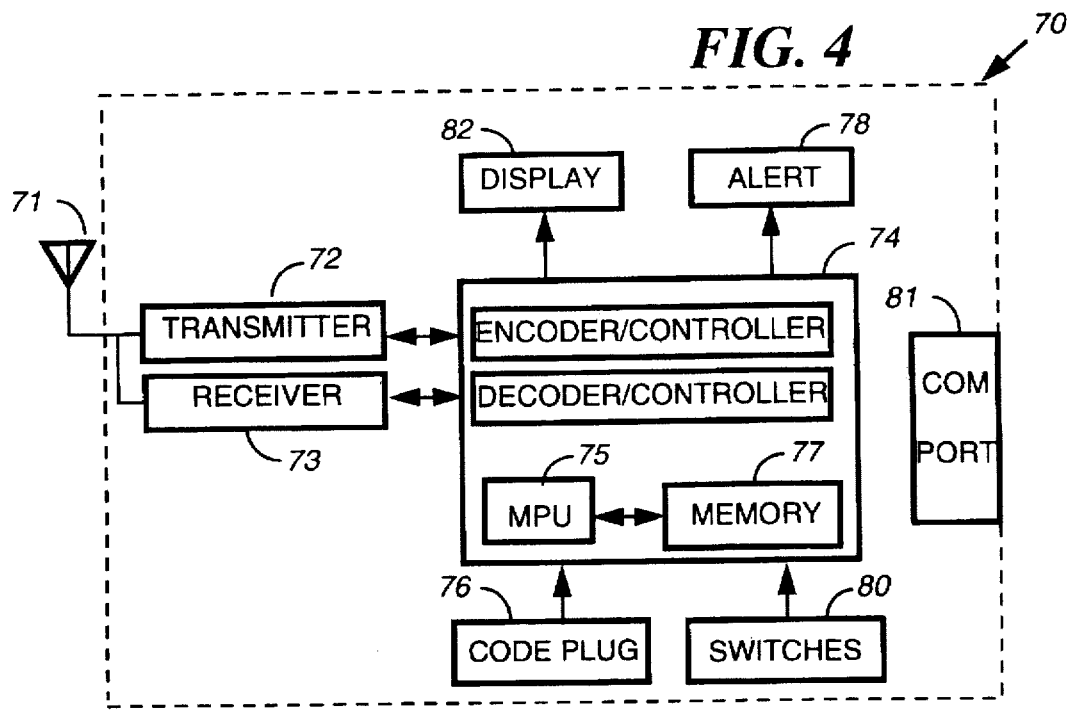
FIG. 4 is a block diagram of a selective call transceiver in accordance with the present invention.

Referring to FIG. 4, selective call transceiver 70 which can operate as one-way selective call receiver in a one-way coverage zone or as selective call transceiver in a two-way coverage zone is shown. Preferably the transceiver 70 comprises a selective call receiver 73 coupled to a decoder and a controller (74) and a selective call transmitter 72 coupled to the controller and an encoder (74). The transceiver 70 preferably further comprises a memory 77 coupled to the controller containing a list of preferred one-way zones, wherein the selective call transceiver will operate as a selective call receiver if the selective call receiver fails to detect a two-way coverage zone and detects a matching preferred one-way zone. Alternatively, the preferred one-way zone list can reside in another memory location such as the code plug 76. The selective call transceiver can further comprise a means of notifying the user of the selective call transceiver that the two-way function of the selective call transceiver is disabled or in other words, that the transmitter is disabled. Such means of notifying can include either a display 82 such a liquid crystal display or a tactile or audible alert 78 such as a transducer or vibrator motor.

Referring to FIG. 1 again, the controllers 41-46 in the communication system 10 preferably comprise a plurality of preferred one-way zone lists corresponding to preferred one-way zone lists in the plurality of selective call transceivers which is periodically updated with the preferred one-way zone list in the plurality of selective call transceivers. The controllers also each preferably comprise a processor for performing the functions of either detecting the presence of a selective call transceiver in a two-way zone and continuing two-way communication if the selective call transceiver is found in the two-way zone or sending one-way outbound messages to the selective call transceiver to a one-way zone if a user directed messages to the one-way zone or otherwise sending one-way outbound messages to the selective call transceiver to the zone or zones designated in the preferred one-way zone list if no two-way zone is detected and no one-way zone is directed by a user of the selective call transceiver. The plurality of one-way zone lists at the controller can be updated by polling the statistically derived preferred one-way zone list at the two-way selective call transceiver and updating the preferred one-way zone list at the controller when the selective call transceiver enters a two-way zone.

Referring to FIG. 4, the portable two-way selective call communication device 70 may take the form of a selective call transceiver as shown. The device 70 includes an antenna 71 for intercepting transmitted RF signals and for transmitting RF signals via a transmitter 72. The antenna 71 couples a received signal to a receiver 73, the receiver 73 and the transmitter 72 forming a transceiver. The transceiver produces a data stream representative of a demodulated received signal coupled to a decoder/controller 74. The transceiver (72, 73) is also responsive to a modulation input such as data received from the decoder/controller 74 to frequency modulate a carrier signal for transmission out from the device 70. As is well known in the art, the decoder/controller 74 may include a central processing unit such as a microprocessor 75 or the like for processing demodulated signal information in accordance with the software stored in a memory 77 of the decoder/controller 74. The decoder/controller 74 is also responsive to inputs from one or more switches 80 or other input devices to generate data that is coupled to the transceiver (72, 73) for transmission out from the device 70. The RF signals transmitted by the transmitter units of a paging subsystem typically include control information containing an address that identifies a particular device 70 and any necessary zone information and/or queries. The page message information follows the control information. The decoder/controller 74 decodes a received address by comparing it with one or more addresses stored in a code plug or code memory 76. If the decoder/controller 74 detects a match between a received address and a stored address, an alert signal may be generated by a device 78 so as to alert a user that a message has been received by the device 70. The alert signal may be an audible and/or tactile alert such as a silent vibrating alert. It is noted that if the RF signals only contain control information and no user viewable message, an alert need not be generated upon an address match. The switches 80 may be actuated by a user to select between the types of alerts as well as for inputting information to the memory 77 and causing a message stored in the memory of the decoder/controller 74 to be accessed for display on a display 82. The switches 80 may also provide additional functions such reset, read, delete, etc. as is well known. It will be apparent that the switches may form a keyboard. Alternative or additional input devices may also be included in or connected to the subscriber unit such as a touch panel, mouse, etc. The device 70 may also include a conventional communication port 81 for hardwire connection to a wired subsystem as well.

Figure 5:
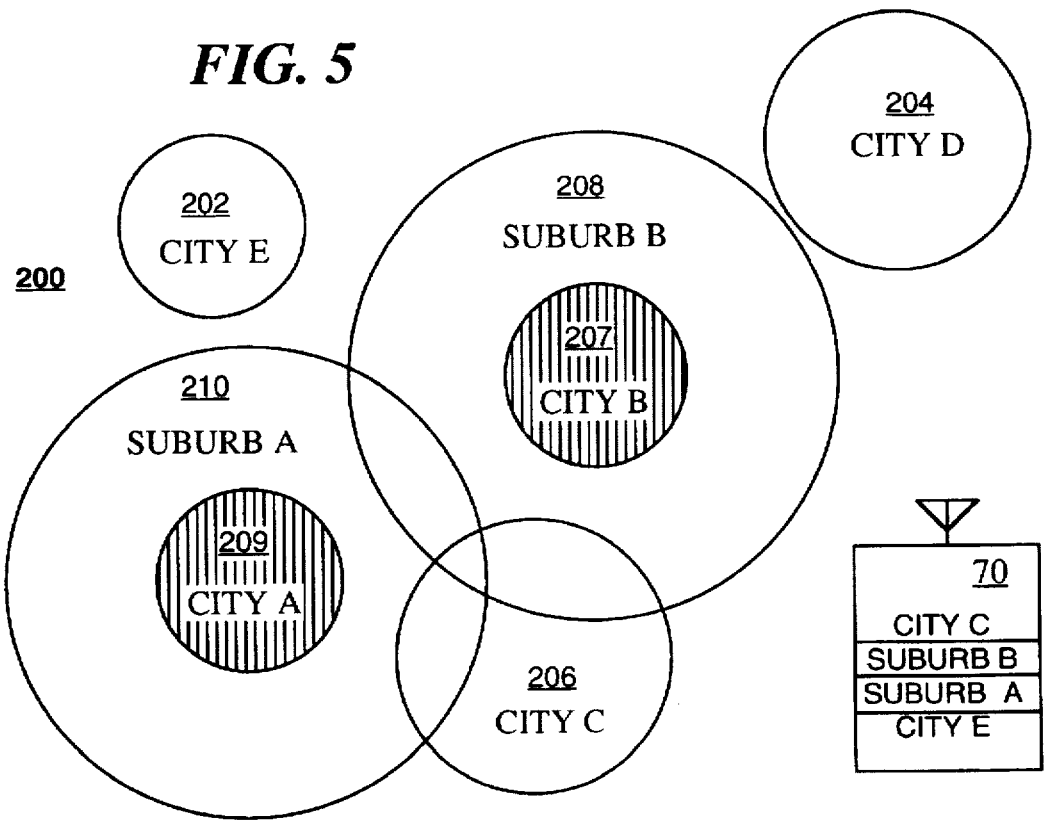
FIG. 5 is another block diagram of a communication system in accordance with the present invention.

Referring to FIG. 5, a communication system 200 is shown having a plurality of one-way zones (202, 204, 206, 208, and 210) and a plurality of two-way zones (207 and 209). The one-way zones 202, 204, 206, 208, and 210 can correspond to geographic areas represented as City E, City D, City C, Suburb B and Suburb A respectively while the two-way zones 207 and 209 can correspond to geographic areas represented as City B and City A respectively. A particular pager will have its own preferred one-way zone list as shown with selective call transceiver 70. When a selective call transceiver cannot be found in any two-way zone, the system can send pages or messages to the zones in the preferred one-way zone list which in the case of selective call transceiver would be City C, City E, Suburb A and Suburb B. Preferably, the selective call transceiver will then display a prompt indicating one-way service only. If the selective call transceiver 70 moves to City D (which is not on the preferred one-way zone list), then the selective call transceiver 70 will display a prompt to have the user call the service provider.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method of making a selective call transceiver operational as a one-way receiver in a one-way selective call receiver coverage zone, comprises the steps at the selective call transceiver of:

maintaining a preferred one-way zone list;

detecting a one-way zone;

matching the one-way-zone with a one-way zone on the preferred one-way zone list; and disabling a two-way function of the selective call transceiver if a match exists between the one-way zone and the one-way zone on the preferred one-way zone list.

2. The method of claim 1, wherein the method further comprises the step of notifying the user of the selective call transceiver that the two-way function of the selective call transceiver is disabled.

3. The method of claim 2, wherein the method further comprises the step of disabling the transmitter of the selective call transceiver.

4. The method of claim 1, wherein the method further comprises the step of notifying the user of the selective call transceiver that the user is in a one-way zone that is not on the preferred one-way zone list.

5. The method of claim 1, wherein the method further comprises the steps at a controller of:

maintaining a preferred one-way zone list matching the list in the two-way selective call transceiver;

seeking the presence of a selective call transceiver in a two-way zone;

continuing two-way communication if the selective call transceiver is found in the two-way zone;

sending one-way outbound messages to the selective call transceiver to a one-way zone if a user directed messages to the one-way zone; and sending one-way outbound messages to the selective call transceiver to the zone or zones designated in the preferred one-way zone list if no two-way zone is detected and no one-way zone is directed by a user of the two-way selective call transceiver.

6. The method of claim 5, wherein the method further comprises the step of polling a statistically derived preferred one-way zone list at the two-way selective call transceiver and updating the preferred one-way zone list at the controller when the selective call transceiver enters a two-way zone.

7. A communication system having a plurality of selective call transceivers which can operate as one-way selective call receivers in a one-way coverage zone or as selective call transceivers in a two-way coverage zone, comprising:

a plurality of outbound transmitters covering one-way coverage zones;

a plurality of base receivers covering a two-way coverage zone; and at least one of the plurality of selective call transceivers having a preferred one-way zone list, the selective call transceivers capable of detecting the one-way coverage zone and disabling the two-way function of the two-way selective call transceiver.

8. The communication system of claim 7, wherein the communication system further comprises a plurality of outbound transmitters designated for the two-way coverage zones, wherein the plurality of selective call transceivers can distinguish between a one-way coverage zone and a two-way coverage zone.

9. The communication system of claim 8, wherein the selective call transceiver distinguishes between the one-way coverage zone and the two-way coverage zone by seeking for an embedded bit of information sent by either the outbound transmitters designated for the two-way coverage zones or the outbound transmitters covering the one-way coverage zones.

10. The communication system of claim 7, wherein the communication system further comprises a controller having a preferred one-way zone list matching the preferred one-way zone list in the selective call transceiver.

11. A selective call transceiver which can operate as one-way selective call receiver in a one-way coverage zone or as selective call transceiver in a two-way coverage zone, comprising:

- a selective call receiver coupled to a decoder and a controller;
- a selective call transmitter coupled to the controller and an encoder;
- a memory coupled to the controller containing a list of preferred one-way zones, wherein the selective call transceiver will operate as a selective call receiver if the selective call receiver fails to detect a two-way coverage zone and detects a matching preferred one-way zone.

12. The selective call transceiver of claim 11, wherein selective call transceiver further comprises a means of notifying the user of the selective call transceiver that the two-way function of the selective call transceiver is disabled.

13. The selective call transceiver of claim 11, wherein selective call transceiver further comprises a liquid crystal display.

14. The selective call transceiver of claim 13, wherein selective call transceiver further comprises a means of notifying the user of the selective call transceiver through the liquid crystal display that the user is in a one-way zone that is not on the preferred one-way zone list.

15. The selective call transceiver of claim 11, wherein the preferred one-way zone list is maintained at the selective call transceiver by statistically tracking at the selective call transceiver the zones where the selective call transceiver is located.

16. A controller for operation in a communication system where a plurality of selective call transceivers can operate as one-way selective call receivers in a one-way coverage zone or as selective call transceivers in a two-way coverage zone, comprising:

- a plurality of preferred one-way zone lists corresponding to preferred one-way zone lists in the plurality of selective call transceivers which is periodically updated with the preferred one-way zone list in the plurality of selective call transceivers;
- a processor for performing the functions of detecting the presence of a selective call transceiver in a two-way zone and continuing two-way communication if the selective call transceiver is found in the two-way zone and sending one-way outbound messages to the selective call transceiver to a one-way zone if a user directed messages to the one-way zone and otherwise sending one-way outbound messages to the selective call transceiver to the zone or zones designated in the preferred one-way zone list if no two-way zone is detected and no one-way zone is directed by a user of the selective call transceiver.

17. The controller of claim 16, wherein the plurality of one-way zone lists at the controller are updated by polling a statistically derived preferred one-way zone list at the two-way selective call transceiver and updating the preferred one-way zone list at the controller when the selective call transceiver enters a two-way zone.

* * * * *